US012623098B2

(12) United States Patent
Neugebauer et al.

(10) Patent No.: US 12,623,098 B2
(45) Date of Patent: May 12, 2026

(54) DUAL MODE BREATHING APPARATUS

(71) Applicant: MSA Technology, LLC, Cranberry Township, PA (US)

(72) Inventors: Nicholas R. Neugebauer, Sewickley, PA (US); Michael Laskowski, Pittsburgh, PA (US); Marco Tekelenburg, Zelienople, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 678 days.

(21) Appl. No.: 17/471,361

(22) Filed: Sep. 10, 2021

(65) Prior Publication Data

US 2022/0080231 A1 Mar. 17, 2022

Related U.S. Application Data

(60) Provisional application No. 63/077,097, filed on Sep. 11, 2020.

(51) Int. Cl.
*A62B 18/10* (2006.01)
*A62B 18/02* (2006.01)
*A62B 18/08* (2006.01)

(52) U.S. Cl.
CPC .............. *A62B 18/10* (2013.01); *A62B 18/02* (2013.01); *A62B 18/084* (2013.01)

(58) Field of Classification Search
CPC ....... A62B 18/10; A62B 18/02; A62B 18/084; A62B 7/04
See application file for complete search history.

(56) References Cited

U.S. PATENT DOCUMENTS 4,172,467 A 10/1979 Warnow
8,256,420 B2 9/2012 Prete
(Continued)

FOREIGN PATENT DOCUMENTS

CN 207071170 U 3/2018
EP 0667171 A1 8/1995
WO 2015/027390 3/2015

OTHER PUBLICATIONS

European Patent Office, Appl. EP21867672.4, Extended European Search Report, Oct. 14, 2024.
CNIPA, Appl. 202180072133.8, First Office Action, Jul. 1, 2025.

*Primary Examiner* — Kendra D Carter
*Assistant Examiner* — Arielle Wolff
(74) *Attorney, Agent, or Firm* — Jones Day

(57) ABSTRACT

A breathing apparatus includes a tank containing pressurized breathing gas, a regulator having an inlet connected to the tank, an outlet for providing breathing gas to a user, and a valve configured for controlling a flow of breathing gas between the inlet and the outlet. A facepiece includes a first port for connecting with the outlet of the regulator, a second port adapted to be connected to an air purifying system, and an exhalation valve. A pneumatic pressure adjustment assembly is in operative connection with the exhalation valve, and has a first pneumatic connection in operative connection with a second pneumatic connection in the regulator. The pneumatic pressure adjustment assembly is operable to adjust the internal facepiece pressure for opening the exhalation valve based on whether breathing gas is delivered to the pneumatic pressure adjustment assembly. An alignment mechanism is provided for aligning the regulator with the facepiece.

21 Claims, 11 Drawing Sheets

(56) References Cited

U.S. PATENT DOCUMENTS

| | | | | |
|---|---|---|---|---|
| 2004/0206357 | A1 | 10/2004 | Kellstrom | |
| 2005/0144706 | A1* | 7/2005 | Taylor | A62B 25/00 2/338 |
| 2010/0236554 | A1* | 9/2010 | Prete | A62B 9/02 128/205.24 |
| 2011/0209712 | A1 | 9/2011 | Busch et al. | |
| 2017/0021201 | A1* | 1/2017 | Baker | A62B 19/00 |

* cited by examiner

DUAL MODE BREATHING APPARATUS

CROSS-REFERENCE TO RELATED APPLICATION

This application claims priority to U.S. Provisional Patent Application No. 63/077,097, filed Sep. 11, 2020, the disclosure of which is hereby incorporated by reference in its entirety.

TECHNICAL BACKGROUND

Technical Field

The present disclosure is generally directed to devices, systems, and methods for operation of a breathing apparatus in multiple modes and, particularly, to devices, systems, and methods for operating a face piece of a breathing apparatus at different pressures via different modes of operation.

Technical Considerations

A self-contained breathing apparatus ("SCBA") is a device used to enable breathing in environments which are immediately dangerous to life and health. For example, firefighters may wear an SCBA when fighting a fire. The SCBA typically has a harness supporting an air tank containing a pressurized source of air. The air tank is operatively connected to a facepiece via an airline to deliver the air to the user. The air tank typically contains air or gas under high pressure (2200 psi-5500 psi) and is connected to a first stage regulator which reduces the pressure to about 80 psi. The SCBA usually has a second stage regulator that has an inlet valve which controls the flow of air for breathing between the air tank and the facepiece. Typically, the inlet valve controls the flow of air through the second stage regulator in response to the respiration demands of the user.

Typically, a diaphragm divides the regulator assembly into an inner chamber having a pressure corresponding to the pressure within the facepiece of the SCBA and an outer chamber having a pressure corresponding to the pressure in the surrounding environment, which is typically ambient pressure. The diaphragm is coupled to an actuating mechanism which opens and closes the inlet valve. The user's respiration creates a pressure differential between the inner and outer chambers of the regulator assembly which, in turn, causes displacement of the diaphragm thereby controlling the inlet valve mechanism, such as by selectively opening and closing the inlet valve mechanism.

The facepiece of the SCBA is typically maintained at a positive pressure as compared to the surrounding environmental pressure to, for example, prevent toxic gases and vapors in the surrounding environment from entering the facepiece. This positive pressure can, for example, be facilitated by biasing the diaphragm with a spring.

Combination breathing apparatuses are devices that combine two or more types of National Institute for Occupational Safety and Health (NIOSH) approved breathing apparatuses into a single integrated system. For example, such combination breathing apparatus may be configured to work as an SCBA in a first mode of operation and as an air purifying respirator (APR) in a second mode of operation. In the APR mode, oxygen is supplied to the user from the working atmosphere and the facepiece is typically maintained at the same pressure as the surrounding environmental pressure. Combining an APR with an SCBA respirator, while meeting all NIOSH breathing test requirements, requires that the exhalation valve meet the low resistance requirement of APR exhalation resistance and also allow pressure within the facepiece to be higher than ambient pressure for SCBA operation. An example of such dual-mode breathing apparatus is disclosed in U.S. Pat. No. 8,256,420, the disclosure of which is incorporated herein by reference in its entirety.

Existing dual mode breathing apparatuses are not configured to adjust the bias of the diaphragm between the SCBA configuration, where the facepiece is maintained at a positive pressure compared to the surrounding environmental pressure, and APR configuration, where the facepiece is maintained at the same pressure as the surrounding environmental pressure. This can make exhalation difficult in the APR configuration. Furthermore, existing dual mode breathing apparatuses are not configured to securely align the regulator assembly with the facepiece each time a connection is made between these two components. Additionally, existing dual mode breathing apparatuses are not configured to prevent the use of a single-mode facepiece with a dual mode regulator assembly.

Accordingly, it would be desirable to improve upon existing dual mode breathing apparatuses.

SUMMARY OF THE DISCLOSURE

Generally, provided is an improved breathing apparatus that may have a tank configured for containing pressurized breathing gas, a regulator having an inlet for connection to the tank via a first airline, an outlet to provide the breathing gas to a user, and a valve configured for controlling a flow of the breathing gas between the inlet and the outlet based at least in part on the respiration of the user. The breathing apparatus further may include a facepiece having a first port configured to be placed in fluid connection with the outlet of the regulator to introduce pressurized breathing gas into the facepiece, a second port adapted to be connected to an air purifying system, and an exhalation valve through which the user's exhausted breath can exit the facepiece. A pneumatic pressure adjustment assembly may be in operative connection with the exhalation valve. The pneumatic pressure adjustment assembly may have a first pneumatic connection in operative connection with a second pneumatic connection in the regulator. The pneumatic pressure adjustment assembly may be operable to adjust the internal facepiece pressure required to open the exhalation valve based on whether the pressurized breathing gas is delivered to the pneumatic pressure adjustment assembly. An alignment mechanism may be provided for aligning the regulator with the facepiece such that the first pneumatic connection of the pressure adjustment assembly in the facepiece is aligned with the second pneumatic connection in the regulator.

According to some non-limiting embodiments or aspects, the alignment mechanism may include a pin on one of the regulator and the facepiece and a corresponding recess on the other of the regulator and the facepiece. The recess may include an open end configured for receiving the pin and a closed end opposite the open end and acting as a stop surface for the pin. The regulator can be rotated relative to the facepiece until the pin is received through the open end of the recess and engages the closed end of the recess. When the pin engages the closed end of the recess, the regulator may be aligned with the facepiece to establish a pneumatic connection in the pneumatic pressure adjustment assembly.

According to some non-limiting embodiments or aspects, a safety device may be provided on the facepiece and be configured for interfacing with a corresponding safety feature on the regulator. The safety device may be a protrusion extending outwardly from a regulator connection interface on the facepiece, and the safety feature on the regulator may be a slot configured for receiving the protrusion when the regulator is connected to the facepiece. An absence of the safety feature on the regulator may prevent the regulator from connecting to the facepiece.

According to some non-limiting embodiments or aspects, the air purifying system may include a filter configured for delivering filtered ambient air to the second port on the facepiece via a second airline. At least one of the filter and the second airline may be connectable to a clip on a harness worn by the user. The filter and the second airline may be removably connectable to the clip. The clip may be movable between a deployed position configured for receiving at least one of the filter and the second airline, and a stowed position. The clip may be removably connected to the harness.

According to some non-limiting embodiments or aspects, an actuator may be provided via which the flow of pressurized breathing gas from the tank to the inlet of the regulator may be started when the actuator is placed in a first state and may be stopped when the actuator is placed in a second state.

According to some non-limiting embodiments or aspects, a facemask configured for use with a breathing apparatus may include a regulator having an inlet for connection to the tank via a first airline, an outlet to provide the breathing gas to a user, and a valve configured for controlling a flow of the breathing gas between the inlet and the outlet based at least in part on the respiration of the user. The facemask further may include a facepiece having a first port configured to be placed in fluid connection with the outlet of the regulator to introduce pressurized breathing gas into the facepiece, a second port adapted to be connected to an air purifying system, and an exhalation valve through which the user's exhausted breath can exit the facepiece. A pneumatic pressure adjustment assembly may be in operative connection with the exhalation valve. The pneumatic pressure adjustment assembly may have a first pneumatic connection in operative connection with a second pneumatic connection in the regulator. The pneumatic pressure adjustment assembly may be operable to adjust the internal facepiece pressure required to open the exhalation valve based on whether the pressurized breathing gas is delivered to the pneumatic pressure adjustment assembly. An alignment mechanism may be provided for aligning the regulator with the facepiece such that the first pneumatic connection of the pressure adjustment assembly in the facepiece is aligned with the second pneumatic connection in the regulator.

In accordance with some embodiments or aspects, the respirator mask may be characterized by one or more of the following clauses:

Clause 1. A breathing apparatus comprising: a tank configured for containing pressurized breathing gas; a regulator comprising an inlet for connection to the tank via a first airline, an outlet to provide the breathing gas to a user, and a valve configured for controlling a flow of the breathing gas between the inlet and the outlet based at least in part on the respiration of the user; a facepiece comprising a first port configured to be placed in fluid connection with the outlet of the regulator to introduce pressurized breathing gas into the facepiece, a second port adapted to be connected to an air purifying system, and an exhalation valve through which the user's exhausted breath can exit the facepiece; a pneumatic pressure adjustment assembly in operative connection with the exhalation valve, the pneumatic pressure adjustment assembly having a first pneumatic connection in operative connection with a second pneumatic connection in the regulator, the pneumatic pressure adjustment assembly operable to adjust the internal facepiece pressure required to open the exhalation valve based on whether the pressurized breathing gas is delivered to the pneumatic pressure adjustment assembly via the second pneumatic connection in the regulator; and an alignment mechanism for aligning the regulator with the facepiece such that the first pneumatic connection of the pressure adjustment assembly in the facepiece is aligned with the second pneumatic connection in the regulator.

Clause 2. The breathing apparatus according to clause 1, wherein the alignment mechanism comprises a pin on one of the regulator and the facepiece and a corresponding recess on the other of the regulator and the facepiece.

Clause 3. The breathing apparatus according to clause 1 or 2, wherein the recess comprises an open end configured for receiving the pin and a closed end opposite the open end and acting as a stop surface for the pin, and wherein the regulator can be rotated relative to the facepiece until the pin is received through the open end of the recess and engages the closed end of the recess.

Clause 4. The breathing apparatus according to any of clauses 1-3, wherein, when the pin engages the closed end of the recess, the regulator is aligned with the facepiece to establish a pneumatic connection in the pneumatic pressure adjustment assembly.

Clause 5. The breathing apparatus according to any of clauses 1-4, further comprising a safety device on the facepiece configured for interfacing with a corresponding safety feature on the regulator.

Clause 6. The breathing apparatus according to any of clauses 1-5, wherein the safety device is a protrusion extending outwardly from a regulator connection interface on the facepiece, and wherein the safety feature on the regulator is a slot configured for receiving the protrusion when the regulator is connected to the facepiece.

Clause 7. The breathing apparatus according to any of clauses 1-6, wherein an absence of the safety feature on the regulator prevents the regulator from connecting to the facepiece.

Clause 8. The breathing apparatus according to any of clauses 1-7, wherein the air purifying system comprises a filter configured for delivering filtered ambient air to the second port on the facepiece via a second airline.

Clause 9. The breathing apparatus according to any of clauses 1-8, wherein at least one of the filter and the second airline is connectable to a clip on a harness worn by the user.

Clause 10. The breathing apparatus according to any of clauses 1-9, wherein the filter and the second airline are removably connectable to the clip.

Clause 11. The breathing apparatus according to any of clauses 1-10, wherein the clip is movable between a deployed position configured for receiving at least one of the filter and the second airline, and a stowed position.

Clause 12. The breathing apparatus according to any of clauses 1-11, wherein the clip is removably connected to the harness.

Clause 13. The breathing apparatus according to any of clauses 1-12 further comprising an actuator via which the flow of pressurized breathing gas from the tank to the inlet of the regulator is started when the actuator is placed in a first state and is stopped when the actuator is placed in a second state.

Clause 14. A facemask configured for use with a breathing apparatus, the facemask comprising: a regulator comprising an inlet configured for connection to the tank containing a pressurized breathing gas, an outlet to provide the breathing gas to a user, and a valve configured for controlling a flow of the breathing gas between the inlet and the outlet based at least in part on the respiration of the user; a facepiece comprising a first port configured to be placed in fluid connection with the outlet of the regulator to introduce pressurized breathing gas into the facepiece, a second port adapted to be connected to an air purifying system, and an exhalation valve through which the user's exhausted breath can exit the facepiece; a pneumatic pressure adjustment assembly in operative connection with the exhalation valve, the pneumatic pressure adjustment assembly having a first pneumatic connection in operative connection with a second pneumatic connection in the regulator, the pneumatic pressure adjustment assembly operable to adjust the internal facepiece pressure required to open the exhalation valve based on whether the pressurized breathing gas is delivered to the pneumatic pressure adjustment assembly; and an alignment mechanism for aligning the regulator with the facepiece such that the first pneumatic connection of the pressure adjustment assembly in the facepiece is aligned with the second pneumatic connection in the regulator.

Clause 15. The facemask according to clause 14, wherein the alignment mechanism comprises a pin on one of the regulator and the facepiece and a corresponding recess on the other of the regulator and the facepiece.

Clause 16. The facemask according to clause 14 or 15, wherein the recess comprises an open end configured for receiving the pin and a closed end opposite the open end and acting as a stop surface for the pin, and wherein the regulator can be rotated relative to the facepiece until the pin is received through the open end of the recess and engages the closed end of the recess.

Clause 17. The facemask according to any of clauses 14-16, wherein, when the pin engages the closed end of the recess, the regulator is aligned with the facepiece to establish a pneumatic connection in the pneumatic pressure adjustment assembly.

Clause 18. The facemask according to any of clauses 14-17, further comprising a safety device on the facepiece configured for interfacing with a corresponding safety feature on the regulator.

Clause 19. The facemask according to any of clauses 14-18, wherein the safety device is a protrusion extending outwardly from a regulator connection interface on the facepiece, and wherein the safety feature on the regulator is a slot configured for receiving the protrusion when the regulator is connected to the facepiece.

Clause 20. The facemask according to any of clauses 14-19, wherein an absence of the safety feature on the regulator prevents the regulator from connecting to the facepiece.

These and other features and characteristics of devices and systems described herein, as well as the methods of manufacture and use of such devices and systems, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

In FIGS. 1-10D, the same characters represent the same components unless otherwise indicated.

DETAILED DESCRIPTION

Figure 1:
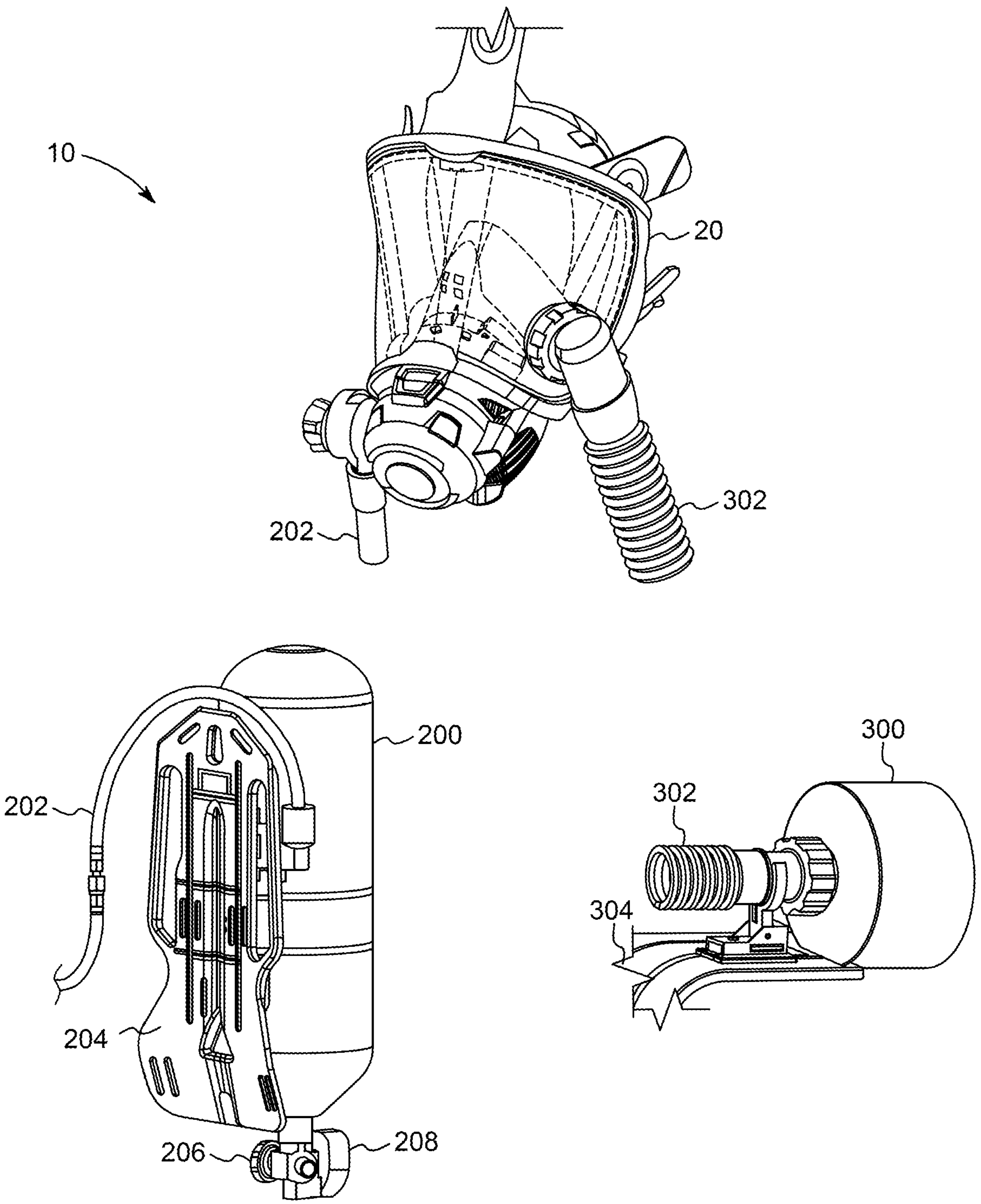
FIG. 1 is a front perspective view of a breathing apparatus according to some non-limiting embodiments or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms “first”, “second”, and the like are not intended to refer to any particular order or chronology, but refer to different conditions, properties, or elements.

All documents referred to herein are “incorporated by reference” in their entirety.

The term “at least” is synonymous with “greater than or equal to”.

As used herein, “at least one of” is synonymous with “one or more of”. For example, the phrase “at least one of A, B, or C” means any one of A, B, or C, or any combination of any two or more of A, B, or C. For example, “at least one of A, B, and C” includes A alone; or B alone; or C alone; or A and B; or A and C; or B and C; or all of A, B, and C.

The term “includes” is synonymous with “comprises”.

As used herein, the terms “parallel” or “substantially parallel” mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms “perpendicular” or “substantially perpendicular” mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of various examples or aspects may describe certain features as being “particularly” or “preferably” within certain limitations (e.g., “preferably”, “more preferably”, or “even more preferably”, within certain limitations). It is to be understood that the disclosure is not limited to these particular or preferred limitations but encompasses the entire scope of the various examples and aspects described herein.

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

The present disclosure is directed to a breathing apparatus that is operable between at least two modes. In a first mode of operation, the breathing apparatus is configured as an SCBA, in which breathing air is delivered to a facepiece from a pressurized air tank via an airline connected to the facepiece and the pressurized air tank. In a second mode of operation, the breathing apparatus is configured as an APR, in which breathing air is delivered to the facepiece via an airline connected to a filter. In some non-limiting embodiments or aspects described herein, the devices, systems, or methods of the dual mode breathing apparatus allow a user to quickly, simply, and automatically switch between facepiece exhalation modes between the SCBA mode and the APR mode.

Figure 2A:
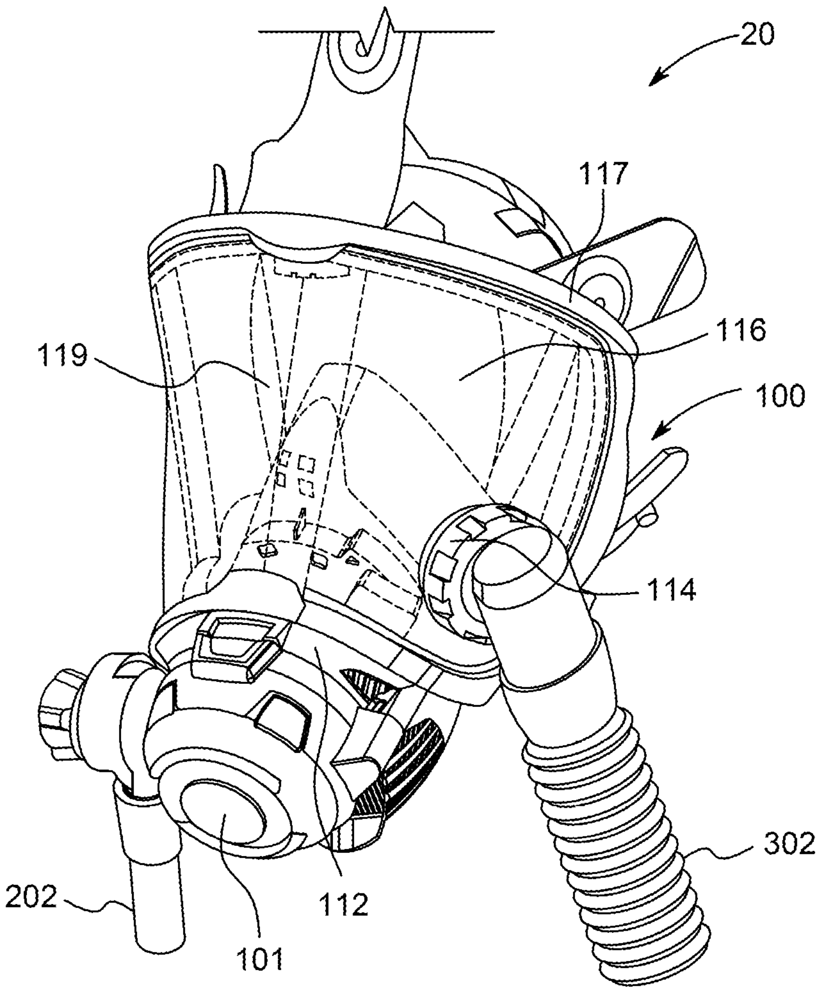
FIG. 2A is front perspective view of a facemask shown in FIG. 1.

With reference to FIG. 1, a breathing apparatus 10 includes a facemask 20 that is configured for being selectively connected to a tank 200 containing pressurized breathing gas for delivery to the facemask 20 via a first airline 202 or a filter 300 configured for delivering filtered ambient air to the facemask 20 via a second airline 302. As shown in FIG. 2A, the facemask 20 includes a facepiece 100 and a regulator 101 removably connectable to the facepiece 100. The facepiece 100 includes a first port 112 formed in a regulator interface portion of the facepiece 100 to place the facepiece 100 in fluid communication with an outlet of the regulator 101 via a mount or mounting interface so that air can be supplied to the facepiece 100 from the tank 200 when the breathing apparatus 10 is operated in the SCBA mode. In some non-limiting embodiments or aspects, the tank 200 is supported on a backplate 204 that is connected to a harness (only portion of a shoulder strap 304 shown in FIG. 1) worn by a user. The tank 200 includes a tank actuation valve 206 to provide pressurized breathing gas to a first stage regulator 208, which then delivers the breathing gas to a second stage pressure regulator associated with the regulator 101 for a final pressure reduction.

With reference to FIG. 2A, the facepiece 100 further includes a second port 114 configured to be in fluid communication with the filter 300 via the second airline 302 when the breathing apparatus 10 is operated in the APR mode. In some embodiments or aspects, the second port 114 may be formed in a lens 116 of the facepiece 100. The lens 116 of the facepiece 100 is seated in a frame 117 having a seal 119 configured to form a seal with the perimeter of user's face. The general operation of an exemplary facepiece is described, for example, in U.S. Pat. No. 8,256,420.

Figure 2B:
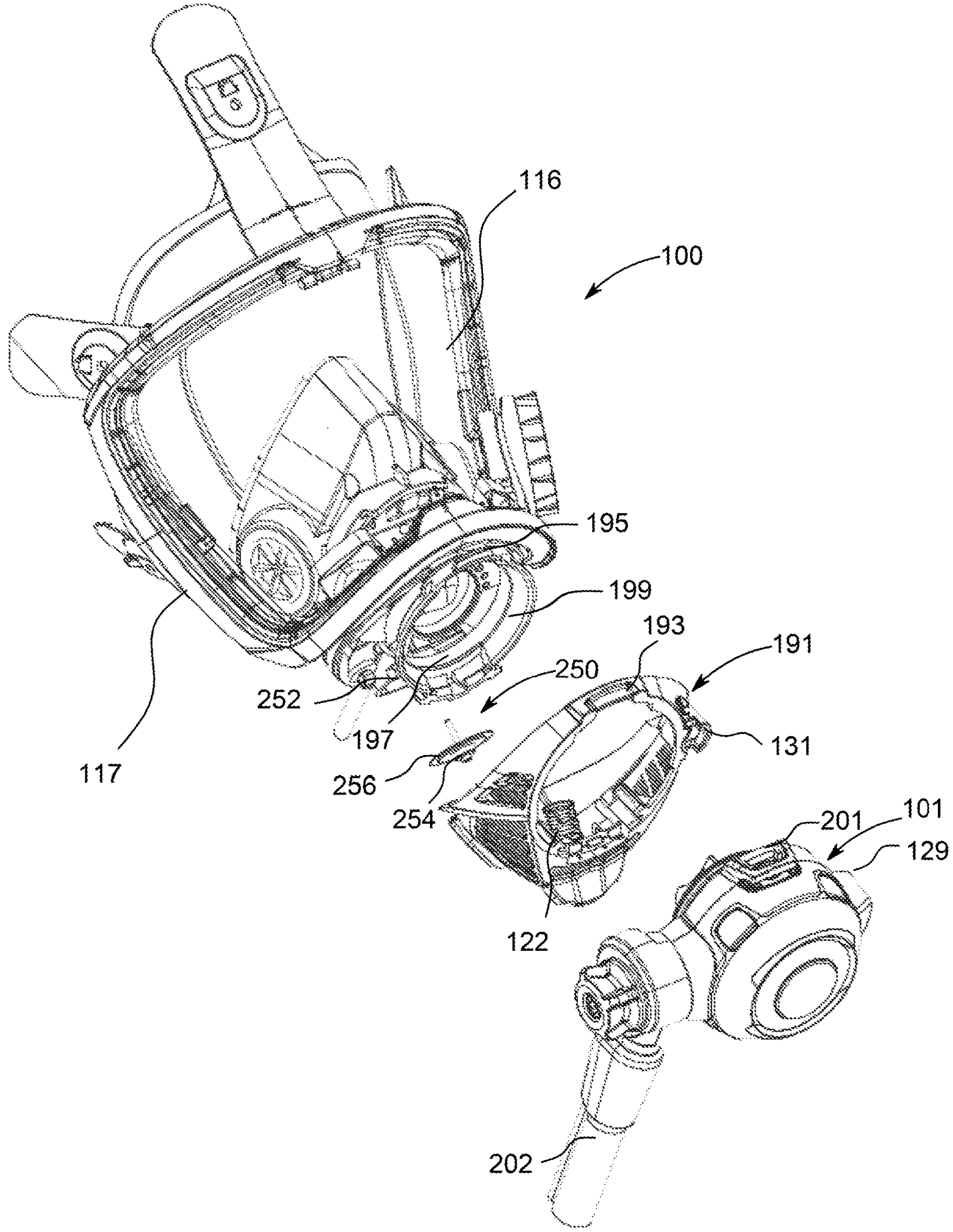
FIG. 2B is an exploded perspective view of a facemask according to some non-limiting embodiments or aspects of the present disclosure.

With reference to FIG. 2B, the facepiece 100 includes an exhalation valve 250 for exhausting the exhaled air from the interior of the facepiece 100. In some non-limiting embodiments or aspects, the exhalation valve 250 is biased against a valve seat 252. The exhalation valve 250 has a rigid contact member 254 and an elastomeric sealing member 256 attached to the contact member 254 and extending beyond an outer edge or perimeter of contact member 254. The exhalation valve 250 is configured to move between a closed position and an open position in response to the user's respiration. The elastomeric sealing member 256 is configured to sealingly engage against the valve seat 252 when the exhalation valve 250 is in the closed position, such as during inhalation. During user exhalation, the pressure created by the user's exhaled breath urges the elastomeric sealing member 256 away from the valve seat 252 to permit exiting of the exhaled air.

With continued reference to FIG. 2B, the facepiece 100 includes a component housing cover 191 that is removably connectable to the regulator interface housing 199. The component housing cover 191 may have a first connection component 193 that is configured for interacting with a second connection component 195 on the regulator interface housing 199. In some non-limiting embodiments or aspects, the first connection component 193 is configured for releasably engaging the second connection component 195 to enable removable connection of the component housing cover 191 to the regulator interface housing 199. The first connection component 193 and the second connection component 195 may be releasably engaged with each other via mechanical or magnetic connection.

With continued reference to FIG. 2B, the regulator interface housing 199 has a connection face 197 configured for engaging the corresponding connection face 201 on the regulator 101. When connected, the regulator 101 is in mechanical and pneumatic connection with the regulator interface housing 199. In some non-limiting embodiments or aspects, the component housing cover 191 of the facemask 100 has a first pneumatic connection 131 that is configured for pneumatically engaging with a second pneumatic connection 129 on the regulator 101. In this manner, the biasing force on the exhalation valve 250 may be controlled depending on the pneumatic pressure between the first pneumatic connection 131 and the second pneumatic connection 129. The second pneumatic connection 129 is in fluid communication with the outlet valve 136 of the regulator 101 (shown in FIG. 8).

With continued reference to FIG. 2B, the exhalation valve 250 is biased in the closed position against the valve seat 252 by a spring 122. With the dual mode breathing apparatus 10, the force with which the exhalation valve 250 is biased against the valve seat 252 is adjustable to adjust the internal pressure within the facepiece 100. In some non-limiting embodiments or aspects, variation in the biasing force on the exhalation valve 250 is achieved by a pneumatic pressure adjustment assembly 124 (shown in FIG. 3). Pneumatic pressure, such as the pressure of the breathing gas from the tank 200 delivered to the regulator 101 via the airline 202, is used as a communication link to provide an automatic indication or signal to the pneumatic pressure adjustment assembly 124 that the system is pressurized. Moreover, pneumatic pressure is also used to transmit force to the exhalation valve 250. In alternative non-limiting embodiments or aspects, other communication links and/or force applicators can be provided to automatically control the force applied to the exhalation valve 250 via the pneumatic pressure adjustment assembly 124. For example, a mechanical link (such as a control cable or wire) can be provided between a pressure tank actuator and the pneumatic pressure adjustment assembly 124. Alternatively, wired or wireless communication systems, as known in the art, can be provided to, for example, actuate an electromechanical actuation system (for example, a solenoid in operative connection with a servo motor) that adjusts the force applied to the exhalation valve 250 via the pneumatic pressure adjustment assembly 124.

The pneumatic pressure adjustment assembly 124 is configured for varying the working length of the spring 122 and thereby control the force needed to open the exhalation valve 250. The pneumatic communication link between the regulator 101 and the exhalation valve 250 in the facepiece 101 operates a mechanical piston assembly when pressurized to adjust the working length of the spring 122, which increases the exhalation pressure of the facepiece 100. When the mechanical piston assembly is depressurized, a return spring returns the piston to its resting position which adjusts the working length of the spring 122 to decrease the exhalation pressure of the facepiece 100. In this manner, adjustment of the opening pressure of the exhalation valve 250 between the SCBA mode and the APR mode is made automatically depending on whether pressurized air is delivered to the regulator 101, such as upon opening or closing of the air tank actuation valve 206. In that regard, preferably no direct or indirect manual adjustments, other than the opening or closing of the air tank actuation valve 206, are required to switch the breathing apparatus 10 between the SCBA mode and the APR mode.

Figure 3:
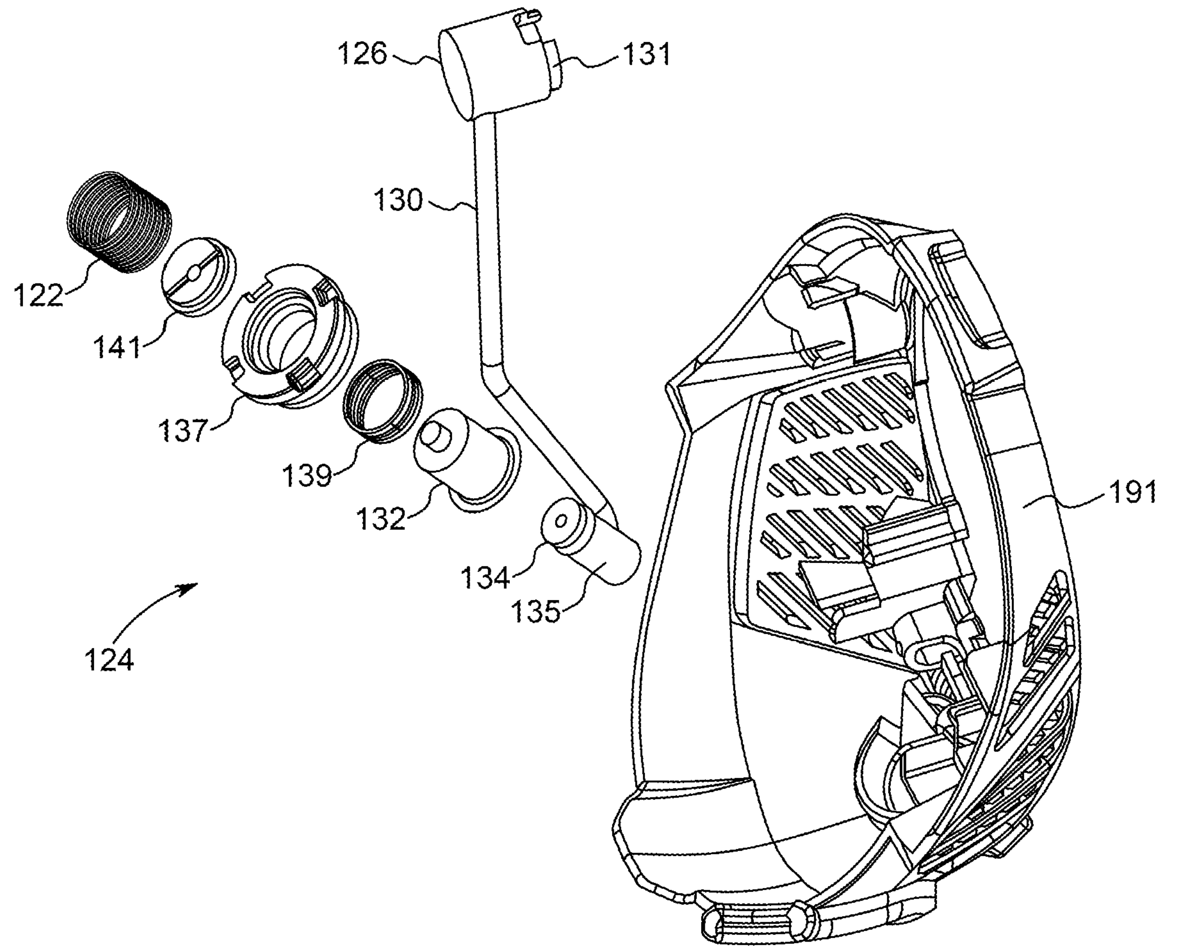
FIG. 3 is an exploded perspective view of a pneumatic pressure adjustment assembly for use with an exhalation valve of a facepiece in accordance with some non-limiting embodiments or aspects of the present disclosure.

With reference to FIG. 3, the pressure adjustment assembly 124 includes an air inlet 126 into which pressurized air from the corresponding second pneumatic connection 129 on the regulator 101 (shown in FIGS. 2B and 8) is introduced when the breathing apparatus 10 is operated in the SCBA mode. The air inlet 126 defines the first pneumatic connection 131 that is configured for pneumatically interacting with a second pneumatic connection 129 (shown in FIG. 2B) on the regulator 101 when the regulator 101 is connected to the facepiece 100. Pressurized air from the second pneumatic connection 129 is introduced into the air inlet 126 and is guided into a piston chamber 128 (shown in FIG. 4A) via a fitting 135 at an end of a conduit or pneumatic tube 130 in fluid connection with the air inlet 126. The piston chamber 128 is defined between the fitting 135 and a piston 132 that is slidably positioned on the fitting 135. A pressure seal is maintained between the piston 132 and the fitting 135, for example, an elastomeric seal, such as an O-ring 134. A piston retainer 137 surrounds at least a portion of an outer surface of the piston 132. The piston retainer 137 is connected to the component housing cover 191 and is configured to delimit movement of the piston 132. A return spring 139 is positioned between the piston 132 and the piston retainer 137. In some non-limiting embodiments or aspects, the return spring 139 is configured to compress when the piston 132 is moved distally, such as when the piston chamber 128 is pressurized. Conversely, the return spring 139 is configured to urge the piston 132 in a proximal direction when the piston chamber 128 is depressurized. A distal end of the piston 132 may have an engagement pad 141 configured for engaging a proximal end of the spring 122.

Figure 4A:
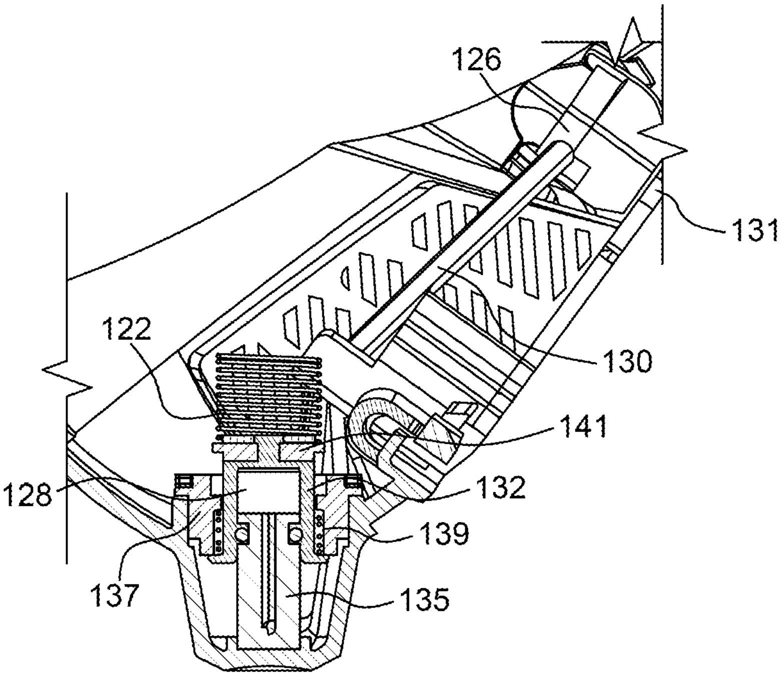
FIG. 4A is side cross-sectional view of the pneumatic pressure adjustment assembly shown in FIG. 3 in a first mode of operation.

Introduction of pressurized air into the piston chamber 128, such as when the regulator 101 is connected to the facepiece 100 to establish a pneumatic connection between the first pneumatic connection 131 and the second pneumatic connection 129, causes the piston 132 to move distally toward the exhalation valve 250 (shown in FIG. 2B), thereby compressing the spring 122 to a first or stressed length corresponding to reduced working length (FIG. 4A). Such distal movement of the piston 132 also compresses the return spring 139. The resultant increase of force due to compression of the spring 122 upon the exhalation valve 250 enables the maintenance of an internal pressure within the facepiece 100 above ambient pressure.

Figure 4B:
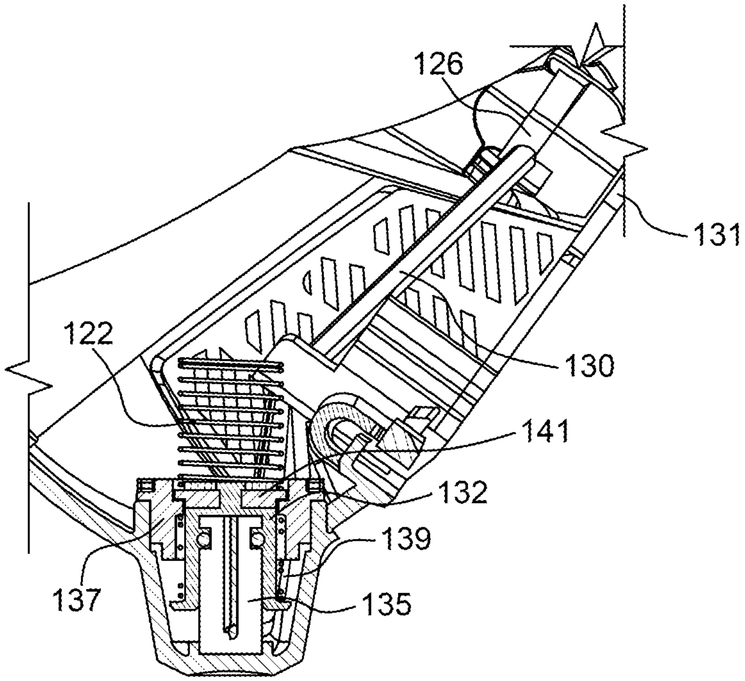
FIG. 4B is side cross-sectional view of the pneumatic pressure adjustment assembly shown in FIG. 3 in a second mode of operation.

With reference to FIG. 4B, upon removal of air pressure from the regulator 101, such as by deactivation of the air tank actuator valve 206, disconnecting the first airline 202, or disconnecting the regulator 101 from the facepiece 100, pressure within the piston chamber 128 is decreased and the return spring 139 causes the piston 132 to move in a proximal direction and away from the spring 122 and the exhalation valve 250 (shown in FIG. 2B). The spring 122 is thereby allowed to relax or to return to a second length corresponding to an increased working length, decreasing the force upon the exhalation valve 250. The reduced force upon the exhalation valve 250 reduces the pressure within the facepiece 100 while allowing the exhalation valve 250 to maintain a seal against its seat.

Figure 5A:
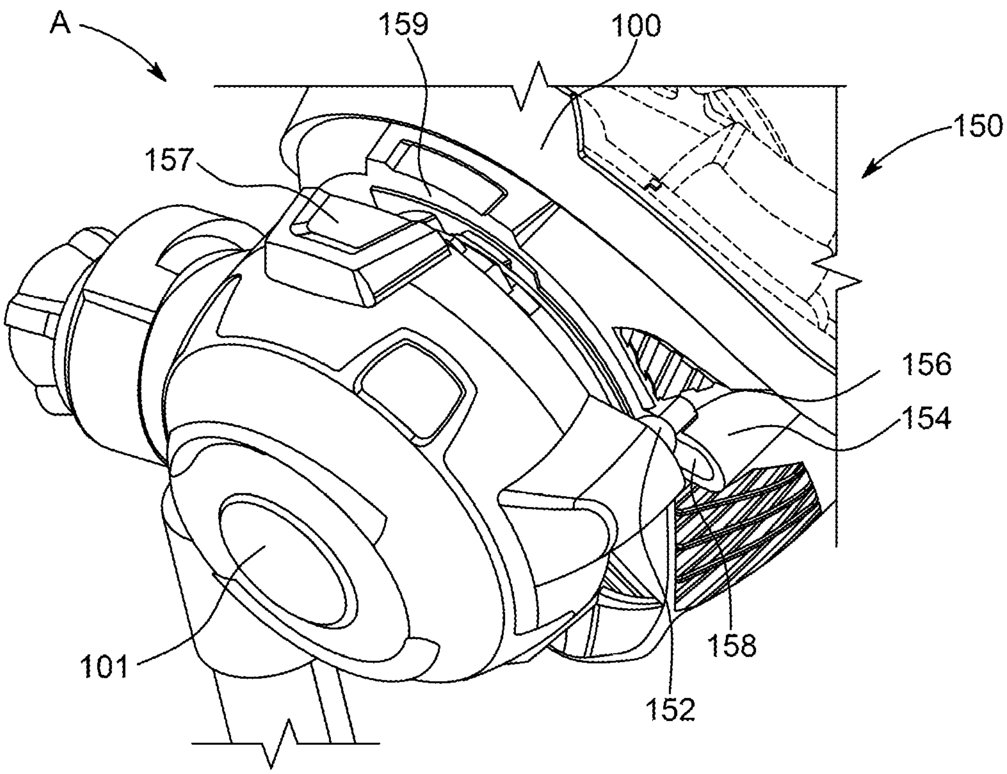
FIGS. 5A-5C are front perspective views of an alignment mechanism for aligning a regulator with a facepiece during connection of the regulator to the facepiece according to some non-limiting embodiments or aspects of the present disclosure.
Figure 5B:
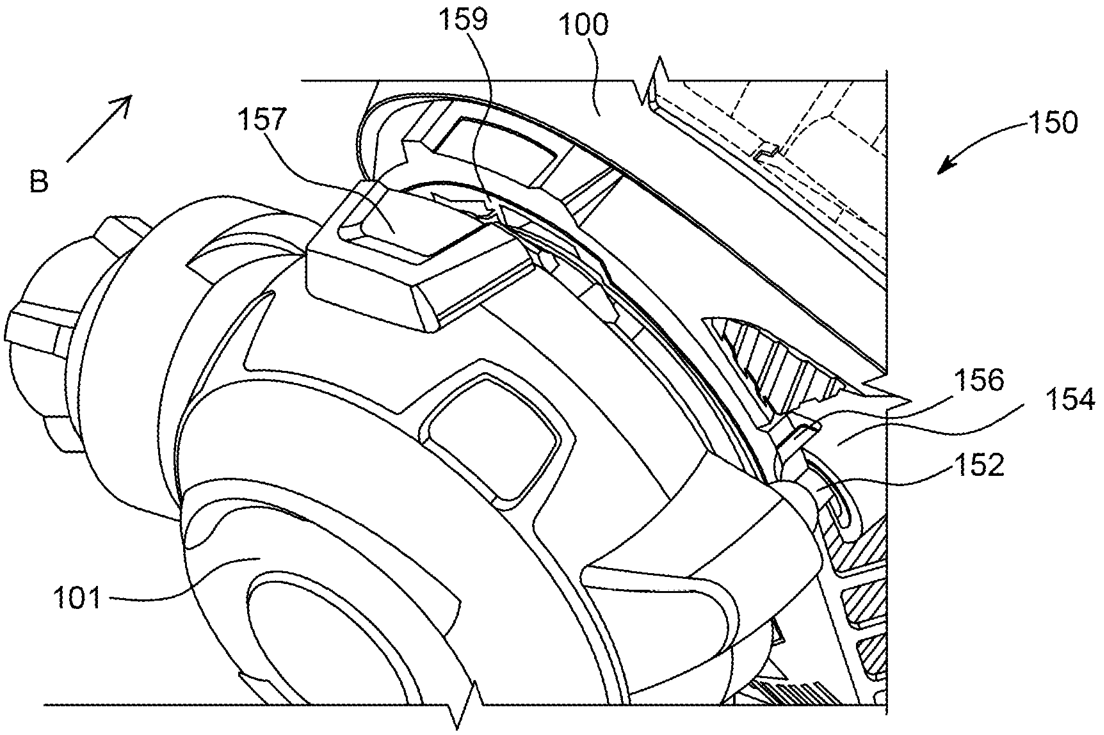
Figure 5C:
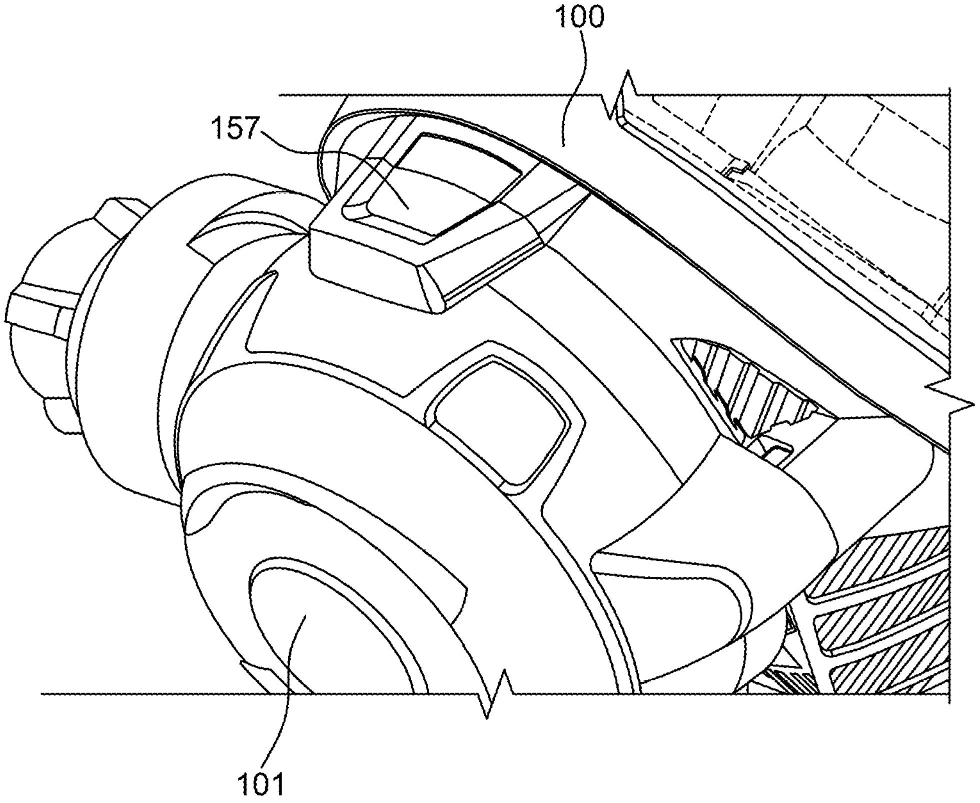

With reference to FIGS. 5A-5C, an alignment mechanism 150 is shown for aligning the regulator 101 with the facepiece 100 according to some non-limiting embodiments or aspects of the present disclosure. The regulator 101 is removably connectable to the facepiece 100 and the user must assure that a corresponding second pneumatic connection 129 (shown in FIGS. 2B and 8) on the regulator 101 is properly aligned with a first pneumatic connection 131 on the facepiece 100 (shown in FIG. 8) when connecting the regulator 101 to the facepiece 100. The regulator 101 and the facepiece 100 are further mechanically connected to maintain the fluid communication between the second pneumatic connection 129 in the regulator 101 and the corresponding first pneumatic connection 131 in the facepiece 100. In some non-limiting embodiments or aspects, the regulator 101 and the facepiece 100 may be connectable by any mechanical connection, such as a bayonet connection, a spring-loaded detent connection, a press-in connection, or any other mechanism connection. One or more locking features may be provided on at least one of the regulator 101 and the facepiece 100 for locking the two components together after they have been aligned. In some situations, it may be difficult to ascertain whether a proper connection between the regulator 101 and the facepiece 100 has been made. If a proper connection is not made, the pneumatic fittings in the communication link between the facepiece 100 and the exhalation valve on the regulator 101 may not be aligned properly, and the spring 122 may not be fully compressed to its compressed state.

With reference to FIGS. 5A-5B, the alignment mechanism 150 may include at least one pin 152 on one of the regulator 101 and the facepiece 100 and a corresponding recess 154 on the other one of the regulator 101 and the facepiece 100. The pin 152 is configured to be received within the recess 154 when the regulator 101 and the facepiece 100 are in proper alignment. The recess 154 may have an open end 156 configured for receiving the pin 152 and a closed end 158 opposite the open end 156 that acts as a stop surface for the pin 152. In this manner, the regulator 101 can be rotated relative to the facepiece 100, such as in a direction of arrow A in FIG. 5A, until the pin 152 is received through the open end 156 of the recess 154 and in engagement with the closed end 158. This brings the regulator 101 in a "staged" position relative to the facepiece 100, wherein the ports on the regulator 101 and the facepiece 100 are aligned but not in fluid communication with each other. In this manner, the alignment mechanism 150 effectively "keys" or aligns the regulator 101 with the facepiece 100 prior to fully connecting the two components together.

With reference to FIG. 5B, once the regulator 101 is rotationally aligned relative to the facepiece 100 such that the pin 152 is received in the recess 154 until it bottoms out against the closed end 158 of the recess 154 (shown in FIG. 5A), the regulator 101 is in rotational alignment with the facepiece 100 and the pneumatic connections in the facepiece 100 and the regulator 101 (129, 131 shown in FIG. 8) are properly oriented for being fluidly connected with each other. The regulator 101 can be urged toward the facepiece 100 in a direction of arrow B to make a full connection therebetween. Such movement of the regulator 101 brings the locking interface on the regulator 101 into engagement with a locking interface on the facepiece 100. For example, a detent 159 in the facepiece 100 may be configured to receive a movable locking element 157 on the regulator 101 to lock the regulator 101 with the facepiece 100 and make a pneumatic connection therebetween. When the regulator 101 is fully connected to the facepiece 100, such as shown in FIG. 5C, the pin 152 is completely received within the recess 154 and the movable locking element 157 is received within the detent 159.

The alignment mechanism 150 makes the connection process between the regulator 101 and the facepiece 100 faster and easier as it allows the user to fully rotate the regulator 101 relative to the facepiece 100 into its proper alignment position with the facepiece 100 prior to making the connection with the facepiece 100. The alignment mechanism 150 further assures a proper connection of the pneumatic connections in the facepiece 100 and the regulator 101 (129, 131 shown in FIG. 8) when the regulator 101 is connected to the facepiece 100 by permitting physical connection between the regulator 101 and the facepiece 100 only when the pneumatic connections 129, 131 are in full alignment. In this manner, the pneumatic connections 129, 131 will always deliver the appropriate pressure to the exhalation valve 250 via the pneumatic pressure adjustment assembly 124.

Figure 5D:
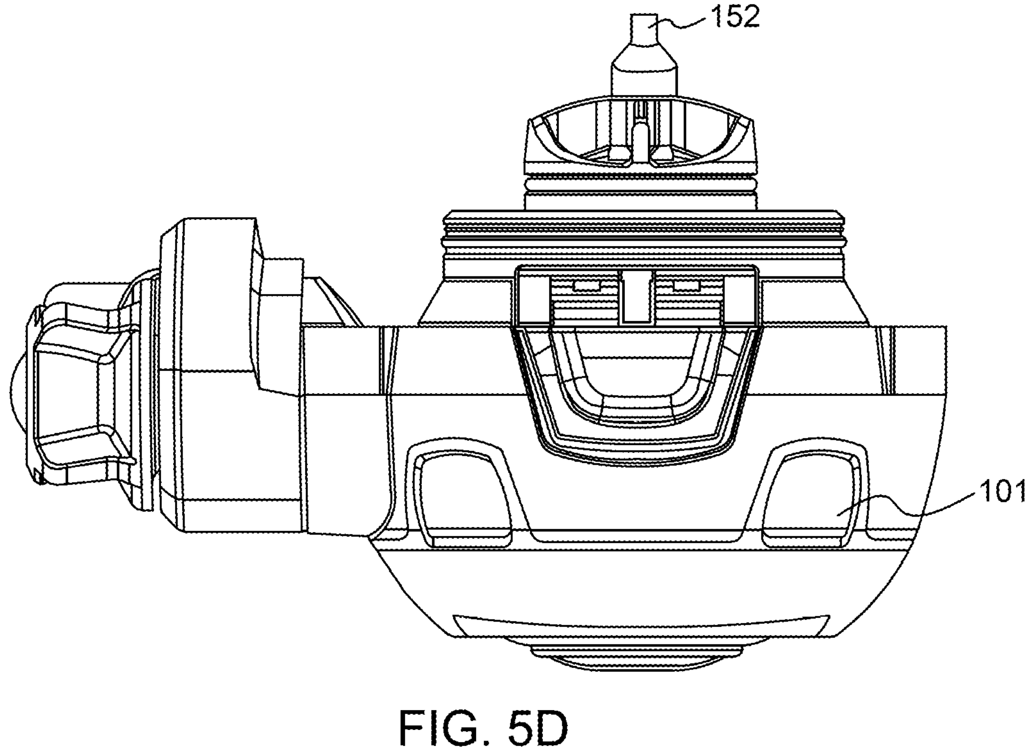
FIG. 5D is a top view of an alignment mechanism for aligning a regulator with a facepiece according to some non-limiting embodiments or aspects of the present disclosure.

In some non-limiting embodiments or aspects, such as shown in FIG. 5D, the alignment mechanism 150 may be arranged such that it is substantially coaxial with a longitudinal axis L of the regulator 101. For example, the regulator 101 may include the pin 152 at a central position of a body of the regulator 101 that is substantially coaxial with the longitudinal axis L.

Figure 6:
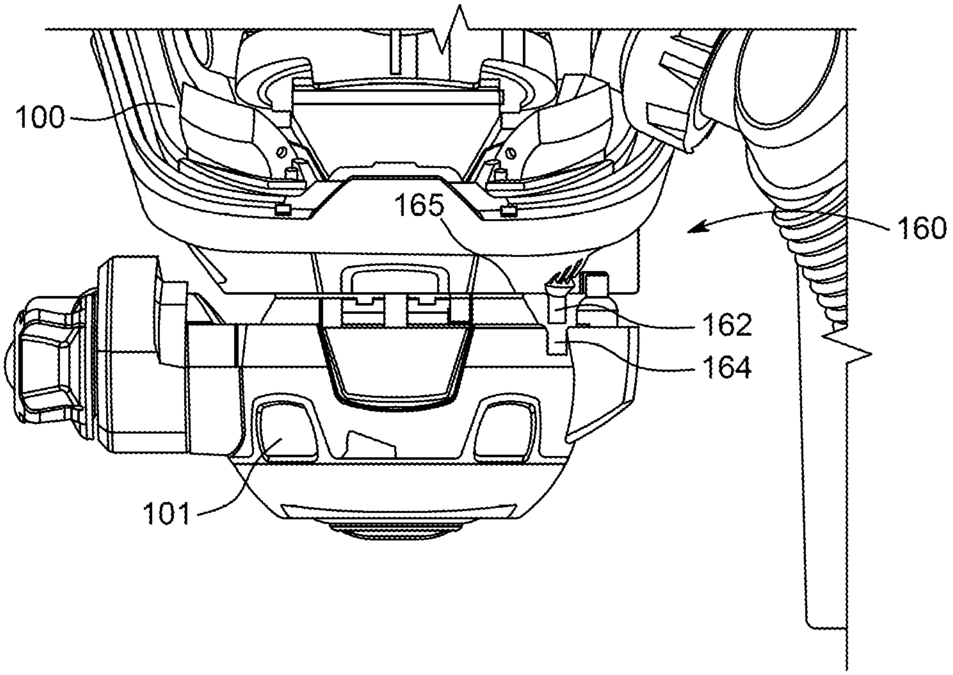
FIG. 6 is a top view of a facepiece safety device shown with a first regulator.
Figure 7:
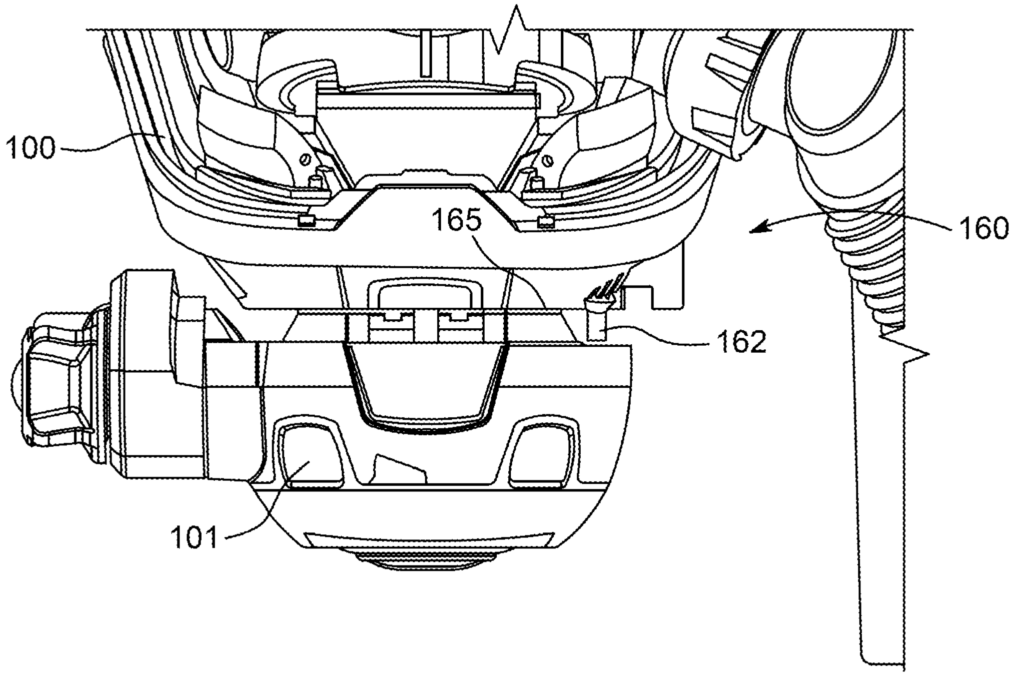
FIG. 7 is a top view of a facepiece safety device shown with a second regulator.

With reference to FIG. 6, in some non-limiting embodiments or aspects, a safety device 160 is provided on the facepiece 100 and is configured for permitting connection only to a regulator 101 having a corresponding safety feature 161 that identifies the regulator 101 as a correct regulator for connecting to the facepiece 100. For example, the safety device 160 may be configured to permit connection of a regulator 101 that has the appropriate pneumatic connections to enable dual-mode use of the facepiece 100. The safety device 160 is further configured to prevent connection of a regulator 101 not having the corresponding safety feature (see FIG. 7). In some embodiments or aspects, the safety device 160 may have a protrusion 162 extending outwardly from a connection interface 165 on the facepiece 100. The corresponding safety feature 161 on the regulator 101 may be a slot 164 configured to receive the protrusion 162 when the regulator 101 is fully connected to the facepiece 100. In this manner, the protrusion 162 and the slot 164 effectively function as a "key" arrangement that permits connection of a regulator 101 having the appropriate slot 164, as shown in FIG. 6, and prevents connection of a regulator 101 not having the slot 164, as shown in FIG. 7.

With continued reference to FIG. 6, the slot 164 may be provided only on an approved regulator 101 configured for dual mode use. The protrusion 162 is shaped to be received within the slot 164 when the regulator 101 is connected to the facepiece 100. A regulator 101 without the slot 164, such as shown in FIG. 7, would be prevented from being connected to the facepiece 100 due to the protrusion 162 on the facepiece 100 interfering with the connection between the facepiece 100 and the regulator 101.

Figure 8:
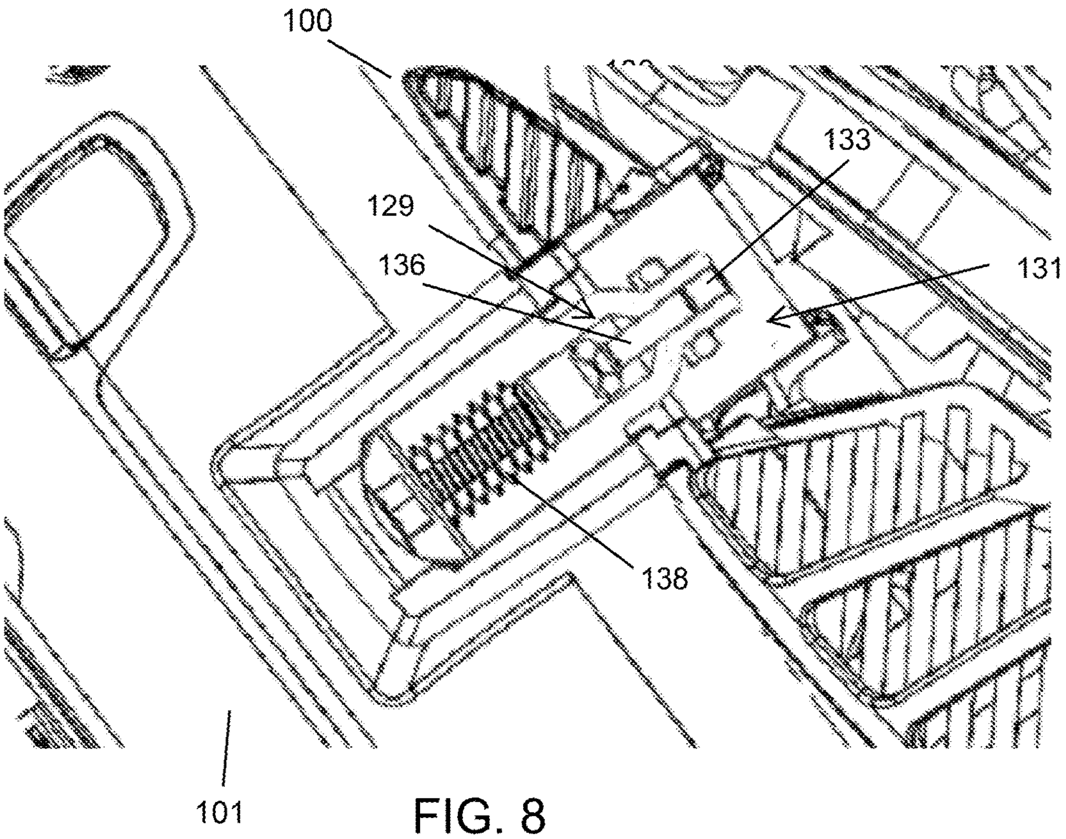
FIG. 8 is a detailed view of a connection interface between a facepiece and a regulator configured for dual mode operation.

With reference to FIG. 8, the connection interface between the first pneumatic connection 131 in the facepiece 100 and the corresponding second pneumatic connection 129 in the regulator 101 is shown in detail. The first pneumatic connection 131 has a post 133 that is configured to engage the outlet valve 136 on the regulator 101. The outlet valve 136 may be biased in a closed position by a spring 138 and is moved to the open position when urged by the post 133 of the first pneumatic connection 131. In some non-limiting embodiments or aspects, the first pneumatic connection 131 in the facepiece 100 can be replaced with a plug 170, shown in FIG. 9. The plug 170 may be configured to receive the corresponding second pneumatic connection 129 from the regulator 101 but not actuate the second pneumatic connection 129. In some non-limiting embodiments or aspects, the plug 170 may be monolithically formed with the facepiece 100 as a non-removable component. In some non-limiting embodiments or aspects, the plug 170 may removable from the facepiece 100 to allow for installation of the first pneumatic connection 131 in the facepiece 100.

Figure 9:
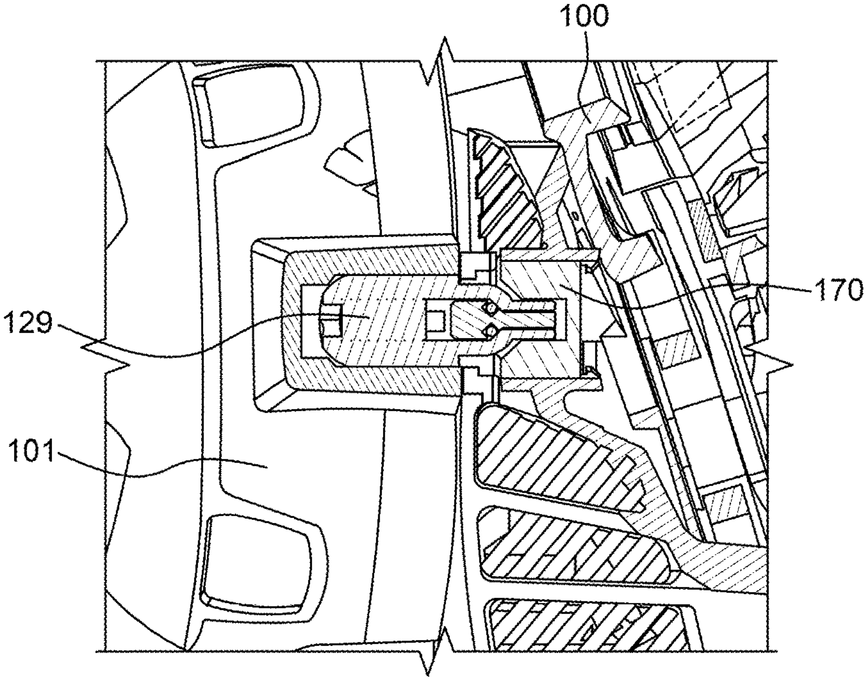
FIG. 9 is a detailed view of a connection interface between a facepiece and a regulator configured for SCBA operation only.

With the provision of the plug 170 shown in FIG. 9, the user has an option for using a facepiece 100 configured for dual mode operation (i.e., a facepiece 100 having the first pneumatic connection 131) or a facepiece 100 configured for SCBA-only operation (i.e., a facepiece 100 having the plug 170), regardless of what regulator 101 is used with the facepiece 100. If the user does not require switchable breathing modes, then the facepiece 100 can be configured with the plug 170, thereby reducing the cost of the facepiece 100. If the user requires a facepiece 100 with switchable modes (SCBA to APR) then the facepiece 100 can be configured with the first pneumatic connection 131 to enable actuation of the exhalation valve 250.

Figure 10A:
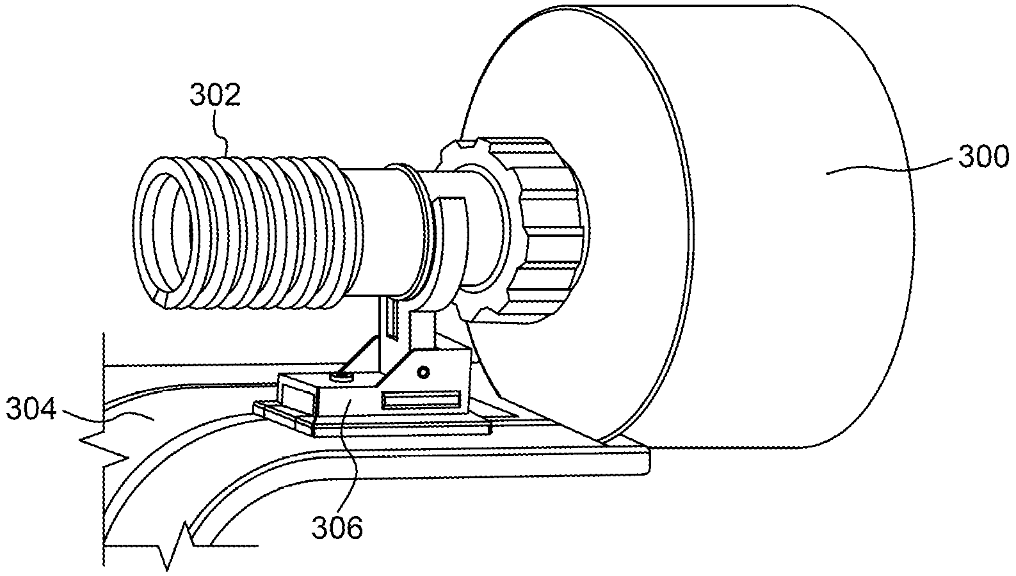
FIG. 10A is front perspective view of a filter and filter clip according to some non-limiting embodiments or aspects of the present disclosure.

With reference to FIG. 10A, the filter 300 is shown connected to a shoulder strap 304 of a harness worn by the user via a clip 306. The filter 300 is configured to filter the ambient air using a filter element (not shown) and deliver the filtered air to the facepiece 100 (shown in FIG. 1) via the second airline 302. By positioning the filter 300 on the shoulder strap 304, the filter 300 can be kept out of the user's way during use of the breathing apparatus 10 (shown in FIG. 1). At least one of the filter 300 and the airline 302 may be removably attachable to the clip 306. In this manner, the filter 300 and the second airline 302 may be removed from the breathing apparatus 10 when the breathing apparatus 10 is used in the SCBA mode.

Figure 10B:
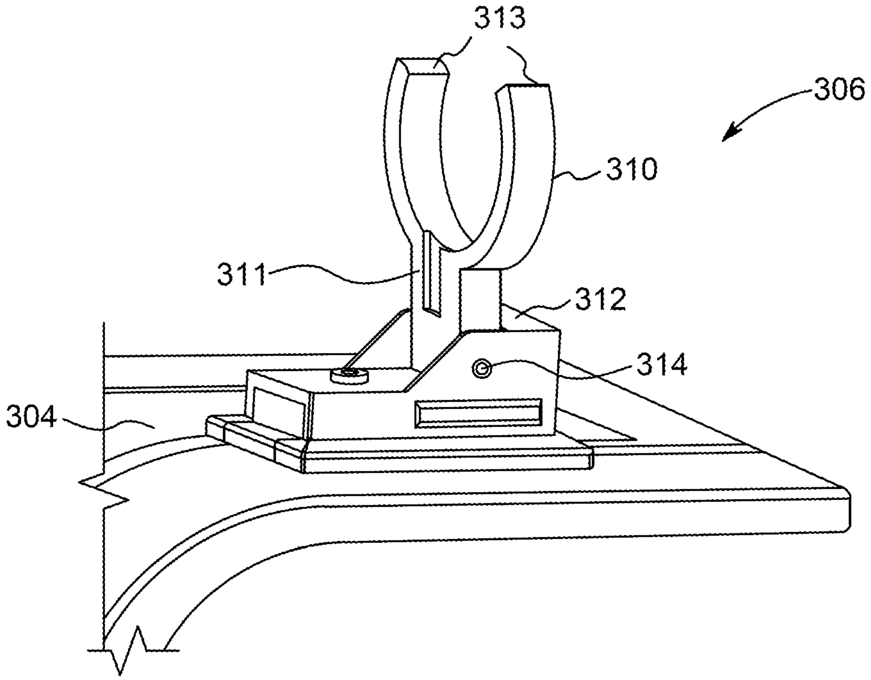
FIG. 10B is front perspective view of the filter clip shown in FIG. 10A without the filter.
Figure 10C:
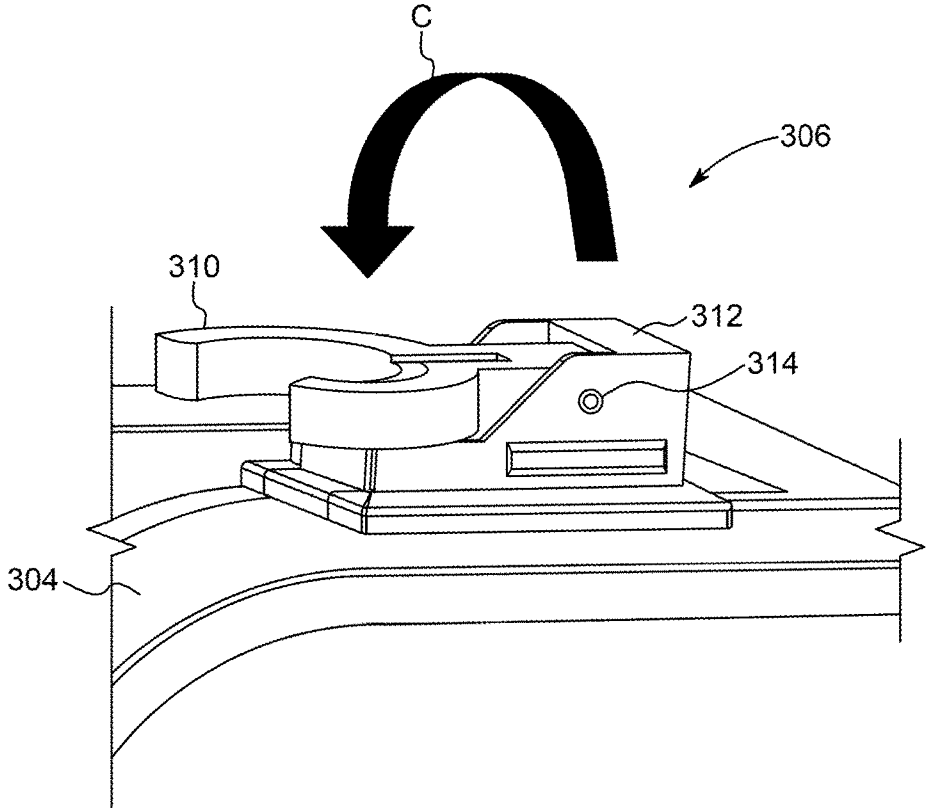
FIG. 10C is a front perspective view of the filter clip shown in FIG. 10B in a folded configuration.

With reference to FIG. 10B, the clip 306 is shown without the filter 300 and the airline 302 attached thereto. The clip 306 may have a retaining portion 310 configured for receiving at least a portion of at least one of the filter 300 and the second airline 302. In some non-limiting embodiment or aspects, the retaining portion 310 may be substantially U-shaped. As shown in FIG. 10B, the retaining portion 310 may have a stem 311 with a pair of arms 313 connected to the stem 311. The arms 313 may be configured for deflecting away from each other to permit insertion and removal of at least one of the filter 300 and the airline 302. The retaining portion 310 may be pivotally connected to a base 312. In this manner, the retaining portion 310 may be movable between a deployed position, in which at least one of the filter 300 and the airline 302 can be connected to or removed from the retaining portion 310 (shown in FIG. 10B), and a stowed position for when the filter 300 and the airline 302 are disconnected from the clip 306 (shown in FIG. 10C). The retaining portion 310 may be moved from the deployed position to the stowed position by rotating the retaining clip 306 relative to the base 312 about a pivot point 314 in a direction of arrow C shown in FIG. 10C. The retaining portion 310 may be moved from the stowed position to the deployed position by rotating the retaining clip 306 relative to the base 312 about the pivot point 314 in a direction opposite to the direction of arrow C shown in FIG. 10C.

Figure 10D:
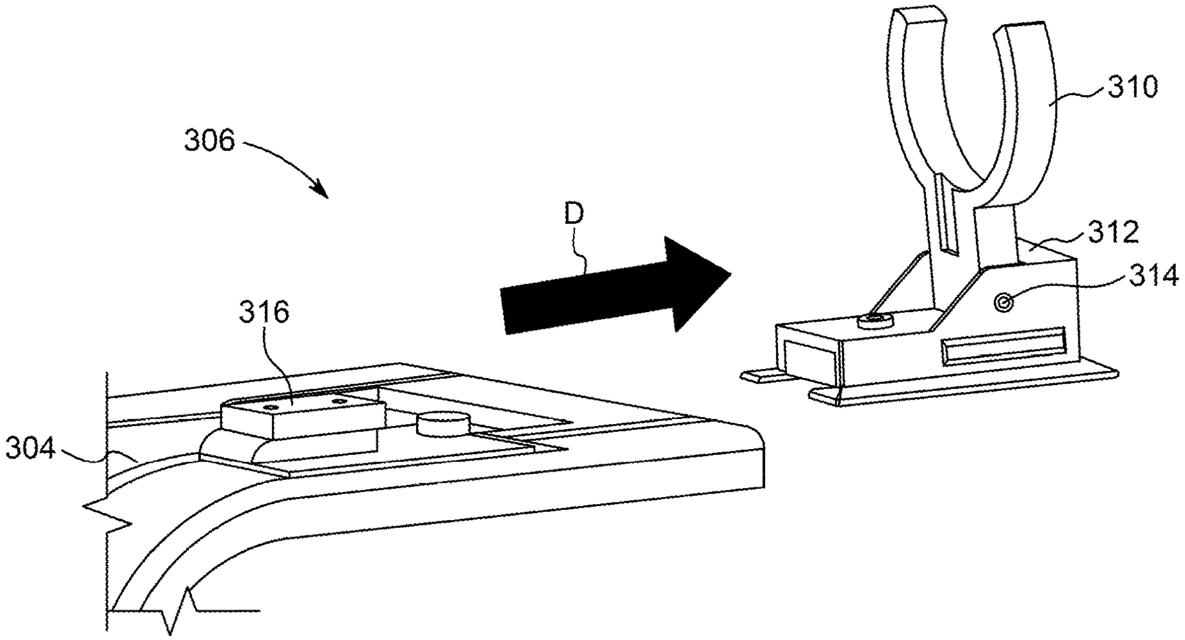
FIG. 10D is a front perspective view of the filter clip shown in FIG. 10B removed from a clip holder.

With reference to FIG. 10D, the clip 306 may be removably connected to the shoulder strap 304. In this manner, the clip 306 can be stowed when the breathing apparatus 10 (shown in FIG. 1) is used in the SCBA mode. In some non-limiting embodiments or aspects, the shoulder strap 304 may have a receiver base 316 directly integrated into the material of the shoulder strap 304. The receiver base 316 may be configured for removably connecting to at least a portion of the clip 306, such as the base 312. In some non-limiting embodiments or aspects, the base 312 of the clip 306 may be removably connectable to the receiver base 316 on the shoulder strap 304 via a tongue-and-groove arrangement, a clip, a fastener, an adhesive, a magnet, any combination thereof, or any other fastening mechanism. To remove the clip 306 from the receiver base 316, the user may pull the base 312 of the clip 306 in a direction of arrow D in FIG. 10D to slide the base 312 away from the receiver base 316.

The non-limiting embodiments or aspects of the present disclosure have been described in detail herein. However, it will be appreciated by those skilled in the art that various modifications and alternatives to the embodiments or aspects may be made without departing from the concepts disclosed in the foregoing description. Such modifications are to be considered as included within the following claims unless the claims, by their language, expressly state otherwise. Accordingly, the particular embodiments or aspects described in detail hereinabove are illustrative only and are not limiting as to the scope of the disclosure, which is to be given the full breadth of the appended claims and any and all equivalents thereof.

The invention claimed is:

1. A breathing apparatus comprising:

a tank configured for containing pressurized breathing gas;

a regulator comprising an inlet for connection to the tank via a first airline, an outlet for providing the pressurized breathing gas to a user, and a valve configured for controlling a flow of the pressurized breathing gas between the inlet and the outlet based at least in part on a respiration demand of the user;

a facepiece comprising a first port configured to be placed in fluid connection with the outlet of the regulator to introduce the pressurized breathing gas into the facepiece, a second port adapted to be connected to an air purifying system, and an exhalation valve for exhausting exhaled breath from the facepiece;

a pneumatic pressure adjustment assembly in operative connection with the exhalation valve, the pneumatic pressure adjustment assembly having a first pneumatic connection in operative connection with a second pneumatic connection in the regulator, the pneumatic pressure adjustment assembly operable to adjust an internal facepiece pressure required to open the exhalation valve based on whether the pressurized breathing gas is delivered to the pneumatic pressure adjustment assembly via the second pneumatic connection in the regulator;

and an alignment mechanism for aligning the regulator with the facepiece such that the first pneumatic connection of the pressure adjustment assembly in the facepiece is aligned with the second pneumatic connection in the regulator, wherein the alignment mechanism comprises a pin on one of the regulator and the facepiece and a corresponding recess on the other of the regulator and the facepiece, wherein the regulator is rotatable relative to the facepiece until the pin is received through an open end of the recess and engages a closed end of the recess, wherein the regulator comprises a connection element configured for mechanical connection of the regulator to the facepiece, wherein the mechanical connection is a bayonet connection, a spring-loaded detent connection, or a press-in connection, and wherein the connection element and the alignment mechanism are separate components of the breathing apparatus.

2. The breathing apparatus according to claim 1, wherein the open end of the recess is configured for receiving the pin and the closed end is opposite the open end and is configured for acting as a stop surface for the pin.

3. The breathing apparatus according to claim 2, wherein, when the pin engages the closed end of the recess, the regulator is aligned with the facepiece to establish a pneumatic connection in the pneumatic pressure adjustment assembly.

4. The breathing apparatus according to claim 1, further comprising a safety device on the facepiece configured for interfacing with a corresponding safety feature on the regulator, wherein an absence of the corresponding safety feature on the regulator prevents the regulator from connecting to the facepiece.

5. The breathing apparatus according to claim 4, wherein the safety device is a protrusion extending outwardly from a regulator connection interface on the facepiece, and wherein the safety feature on the regulator is a slot configured for receiving the protrusion when the regulator is connected to the facepiece.

6. The breathing apparatus according to claim 1, wherein the air purifying system comprises a filter configured for delivering filtered ambient air to the second port on the facepiece via a second airline.

7. The breathing apparatus according to claim 6, wherein at least one of the filter and the second airline is connectable to a clip on a harness worn by the user.

8. The breathing apparatus according to claim 7, wherein at least one of the filter and the second airline is removably connectable to the clip.

9. The breathing apparatus according to claim 7, wherein the clip is movable between a deployed position configured for receiving at least one of the filter and the second airline, and a stowed position.

10. The breathing apparatus according to claim 7, wherein the clip is removably connected to the harness.

11. The breathing apparatus according to claim 1, further comprising an actuator via which the flow of the pressurized breathing gas from the tank to the inlet of the regulator is started when the actuator is in a first state and is stopped when the actuator is in a second state.

12. The breathing apparatus according to claim 1, wherein the pneumatic pressure adjustment assembly comprises a piston, a piston retainer surrounding at least a portion of the piston, and a return spring positioned between the piston and the piston retainer.

13. The breathing apparatus according to claim 12, wherein a distal end of the piston is engaged directly or indirectly with a second spring.

14. The breathing apparatus according to claim 1, wherein the connection element comprises a locking interface configured to removably connect to a locking interface on the facepiece.

15. The breathing apparatus according to claim 1, wherein the connection element is further configured for direct connection of the regulator to the facepiece.

16. A facemask configured for use with a breathing apparatus, the facemask comprising:

a regulator comprising an inlet configured for connection to a tank containing a pressurized breathing gas, an outlet for providing the pressurized breathing gas to a user, and a valve configured for controlling a flow of the pressurized breathing gas between the inlet and the outlet based at least in part on the respiration of the user;

a facepiece comprising a first port configured to be placed in fluid connection with the outlet of the regulator to introduce the pressurized breathing gas into the facepiece, a second port adapted to be connected to an air purifying system, and an exhalation valve for exhausting exhaled breath from the facepiece;

a pneumatic pressure adjustment assembly in operative connection with the exhalation valve and operable to adjust the internal facepiece pressure required to open the exhalation valve based on whether the pressurized breathing gas is delivered to the pneumatic pressure adjustment assembly;

and an alignment mechanism for aligning the regulator with the facepiece such that the pin is configured to be received within the recess when a first pneumatic connection of the pressure adjustment assembly in the facepiece is aligned with a corresponding second pneumatic connection of the pressure adjustment assembly in the regulator, wherein the alignment mechanism comprises a pin on one of the regulator and the facepiece and a corresponding recess on the other of the regulator and the facepiece, wherein the regulator is rotatable relative to the facepiece until the pin is received through an open end of the recess and engages a closed end of the recess, wherein the regulator comprises a connection element configured for mechanical connection of the regulator to the facepiece, wherein the mechanical connection is a bayonet connection, a spring-loaded detent connection, or a press-in connection, and wherein the connection element and the alignment mechanism are separate components of the breathing apparatus.

17. The facemask according to claim 16, wherein the open end of the recess is configured for receiving the pin and the closed end is opposite the open end and is configured for acting as a stop surface for the pin.

18. The facemask according to claim 16, wherein, when the pin engages the closed end of the recess, the regulator is aligned with the facepiece to establish a pneumatic connection in the pneumatic pressure adjustment assembly.

19. The facemask according to claim 16, further comprising a safety device on the facepiece configured for interfacing with a corresponding safety feature on the regulator, wherein an absence of the corresponding safety feature on the regulator prevents the regulator from connecting to the facepiece.

20. The facemask according to claim 19, wherein the safety device is a protrusion extending outwardly from a regulator connection interface on the facepiece, and wherein the safety feature on the regulator is a slot configured for receiving the protrusion when the regulator is connected to the facepiece.

21. A breathing apparatus comprising:

a tank configured for containing pressurized breathing gas;

a regulator comprising an inlet for connection to the tank via a first airline, an outlet for providing the pressurized breathing gas to a user, and a valve configured for controlling a flow of the pressurized breathing gas between the inlet and the outlet based at least in part on a respiration demand of the user;

a facepiece comprising a first port configured to be placed in fluid connection with the outlet of the regulator to introduce the pressurized breathing gas into the facepiece, a second port adapted to be connected to an air purifying system, and an exhalation valve for exhausting exhaled breath from the facepiece;

a pneumatic pressure adjustment assembly in operative connection with the exhalation valve, the pneumatic pressure adjustment assembly having a first pneumatic connection in operative connection with a second pneumatic connection in the regulator, the pneumatic pressure adjustment assembly operable to adjust an internal facepiece pressure required to open the exhalation valve based on whether the pressurized breathing gas is delivered to the pneumatic pressure adjustment assembly via the second pneumatic connection in the regulator;

a mechanical connection that mechanically connects the regulator and the facepiece; and an alignment mechanism for aligning the regulator with the facepiece such that the first pneumatic connection of the pressure adjustment assembly in the facepiece is aligned with the second pneumatic connection in the regulator, wherein the alignment mechanism comprises a pin on one of the regulator and the facepiece and a corresponding recess on the other of the regulator and the facepiece, wherein the regulator is rotatable relative to the facepiece until the pin is received through an open end of the recess and engages a closed end of the recess, and wherein after the pin is received within the recess, the pin remains axially movable within the recess until the regulator and the facepiece are fully connected.

* * * * *